United States Patent
Aoki

(10) Patent No.: US 7,684,606 B2
(45) Date of Patent: Mar. 23, 2010

(54) IMAGE PROCESSING APPARATUS WHICH REMOVES IMAGE DATA OF OVERLAPPING CELLS

(75) Inventor: Masahiro Aoki, Tokyo (JP)

(73) Assignee: Olympus Corporation, Tokyo (JP)

( * ) Notice: Subject to any disclaimer, the term of this patent is extended or adjusted under 35 U.S.C. 154(b) by 1122 days.

(21) Appl. No.: 11/312,115

(22) Filed: Dec. 20, 2005

(65) Prior Publication Data
US 2006/0140467 A1    Jun. 29, 2006

(30) Foreign Application Priority Data
Dec. 28, 2004    (JP) .............................. 2004-381511

(51) Int. Cl.
G06K 9/00    (2006.01)
G06K 9/66    (2006.01)
G01N 21/25    (2006.01)

(52) U.S. Cl. .................... 382/133; 382/190; 356/417
(58) Field of Classification Search ......... 382/128–133, 382/164, 168–172; 250/458.1, 461.2; 356/318, 356/417, 453, 73
See application file for complete search history.

(56) References Cited

U.S. PATENT DOCUMENTS

| | | | |
|---|---|---|---|
| 4,475,236 A * | 10/1984 | Hoffman | .................... 382/134 |
| 4,905,169 A * | 2/1990 | Buican et al. | ............... 356/365 |
| 5,117,466 A * | 5/1992 | Buican et al. | ............... 382/133 |
| 5,427,910 A | 6/1995 | Kamentsky | |
| 5,523,207 A | 6/1996 | Kamentsky | |
| 5,555,196 A * | 9/1996 | Asano | ........................ 382/128 |

(Continued)

FOREIGN PATENT DOCUMENTS

JP    03-255365 A    11/1991

(Continued)

OTHER PUBLICATIONS

Clocksin, Automatic segmentation of overlapping nuclei with high background variation using robust estimation and flexible contour models, Proceedings of the 12th International Conference on Image Analysis and Processing (ICIAP'03).*

(Continued)

Primary Examiner—Anand Bhatnagar
Assistant Examiner—Andrae S Allison
(74) Attorney, Agent, or Firm—Frishauf, Holtz, Goodman & Chick, P.C.

(57) ABSTRACT

An image processing apparatus includes an area specifying unit that specifies a closed area emitting fluorescence in a fluorescence image as a cell area in a cell population including a number of dispersed cells. The fluorescence image is generated from fluorescence emitted by the cell population irradiated with a scanning laser beam. The apparatus also includes a nucleus data removing unit that removes data corresponding to a nucleus in the cell area; an overlapping cell specifying unit that specifies an overlapping cell area where cells overlap, based on a fluorescence intensity of a cytoplasm portion corresponding to an image where the data corresponding to the nucleus is removed; and an analyzed image generating unit that generates an analyzed image where data of the overlapping cell area is removed from the fluorescence image.

7 Claims, 9 Drawing Sheets

U.S. PATENT DOCUMENTS

| | | | | |
|---|---|---|---|---|
| 5,555,198 | A | * | 9/1996 | Asano .......................... 382/128 |
| 5,567,627 | A | * | 10/1996 | Lehnen ........................ 436/518 |
| 5,867,610 | A | * | 2/1999 | Lee .............................. 382/283 |
| 6,091,842 | A | * | 7/2000 | Domanik et al. ............. 382/133 |
| 6,677,596 | B2 | * | 1/2004 | Engelhardt et al. ........ 250/458.1 |
| 6,853,455 | B1 | * | 2/2005 | Dixon et al. .................. 356/453 |
| 7,365,344 | B2 | * | 4/2008 | Aoki ......................... 250/458.1 |

OTHER PUBLICATIONS

Hu et al, "Automated Cell Nucleus Segmentation Using Improved Snake", 2004 International Conference on Image Processing (ICIP).*

* cited by examiner

IMAGE PROCESSING APPARATUS WHICH REMOVES IMAGE DATA OF OVERLAPPING CELLS

CROSS-REFERENCE TO RELATED APPLICATIONS

This application is based upon and claims the benefit of priority from Japanese Patent Application No. 2004-381511, filed Dec. 28, 2004, the entire contents of which are incorporated herein by reference.

BACKGROUND OF THE INVENTION

1. Field of the Invention

The present invention relates to an image processing apparatus which is used in a scanning cytometer. The scanning cytometer irradiates a cell population including a number of dispersed cells with a scanning laser beam, and performs an image processing on a fluorescence image obtained based on fluorescence emitted by the cell population, thereby analyzing the cells in the image.

2. Description of the Related Art

Conventionally, a cytometry has been widely used to investigate a transition process of a cancer cell and the like. In the cytometry technique, a laser beam irradiates a cell population including a number of dispersed cells so that a fluorescence image is obtained and the features and the properties of the cells are analyzed. A flow cytometer is known as a method of obtaining a fluorescence intensity from a cell population. In the flow cytometry technique, suspended cells each of which is isolated are jetted through to be exposed to laser irradiation. This flow cytometry technique allows obtaining only a fluorescence intensity for each isolated cell. So this technique has disadvantages that it cannot obtain the fluorescence image of the cell and a recall observation in which the same cell is again observed cannot be performed. As a method to overcome the disadvantages, the technique of a scanning cytometer is disclosed, in which a laser beam scans over a glass slide to obtain a fluorescence image with a cell population statically disposed on the glass slide (See Japanese Patent Application Laid-Open No. H3-255365, for example).

SUMMARY OF THE INVENTION

An image processing apparatus according to one aspect of the present invention includes an area specifying unit that specifies a closed area emitting fluorescence in a fluorescence image as a cell area in a cell population including a number of dispersed cells, the fluorescence image being generated from fluorescence emitted by the cell population irradiated with a scanning laser beam; a nucleus data removing unit that removes data corresponding to a nucleus in the cell area; an overlapping cell specifying unit that specifies an overlapping cell area where cells overlap, based on a fluorescence intensity of a cytoplasm portion corresponding to an image where the data corresponding to the nucleus is removed; and an analyzed image generating unit that generates an analyzed image where data of the overlapping cell area is removed from the fluorescence image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
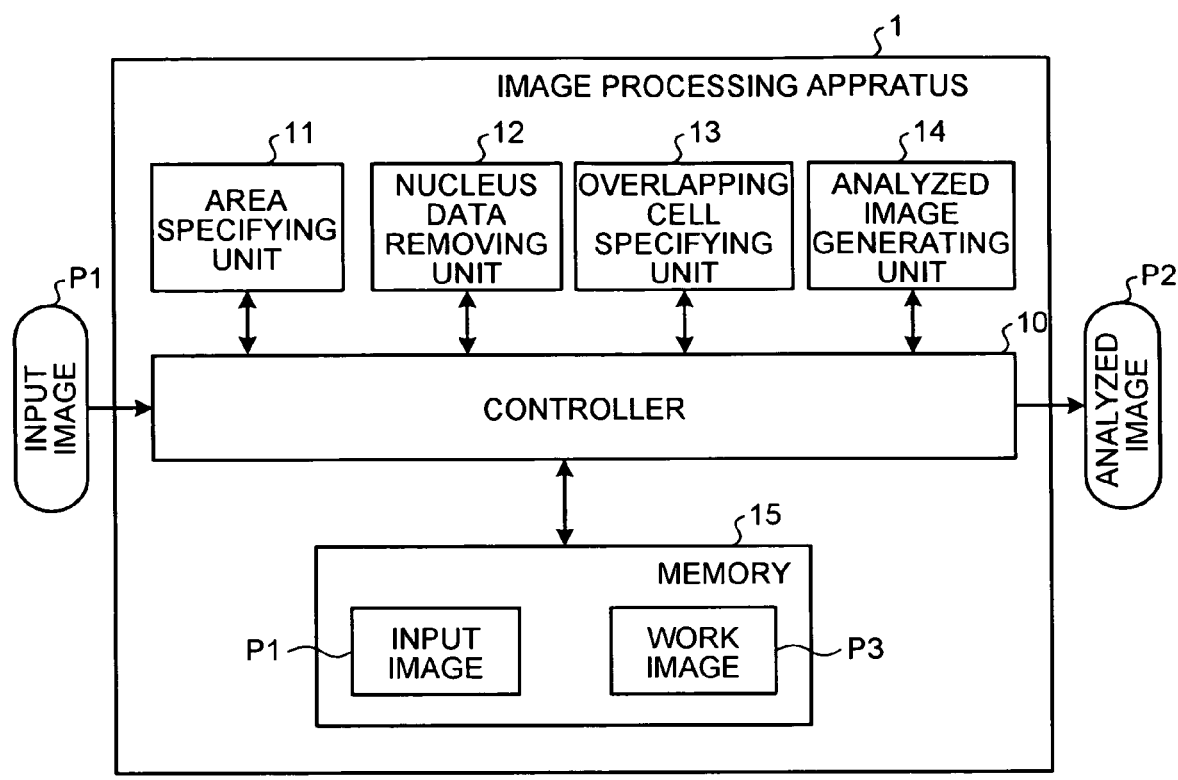
FIG. 1 is a block diagram showing the schematic structure of an image processing apparatus according to a first embodiment of the present invention.

FIG. 1 is a block diagram showing the schematic structure of an image processing apparatus according to a first embodiment of the present invention. The image processing apparatus 1 is configured to accept an input image P1 obtained as a fluorescence image and then to output an analyzed image P2 in which image data of an overlapping cell is removed not to be analyzed.

The image processing apparatus 1, as shown in FIG. 1, includes a controller 10, an area specifying unit 11 that specifies a distribution area of the cells to be picked up, a nucleus data removing unit 12 that removes image data of a nucleus, an overlapping cell specifying unit 13 that specifies an overlapping cell, an analyzed image generating unit 14 that generates an analyzed image, and a memory 15 that stores the input image P1 and a work image P3. The controller 10 is connected to the area specifying unit 11, the nucleus data removing unit 12, the overlapping cell specifying unit 13, the analyzed image generating unit 14, and the memory 15 to control them.

Figure 2:
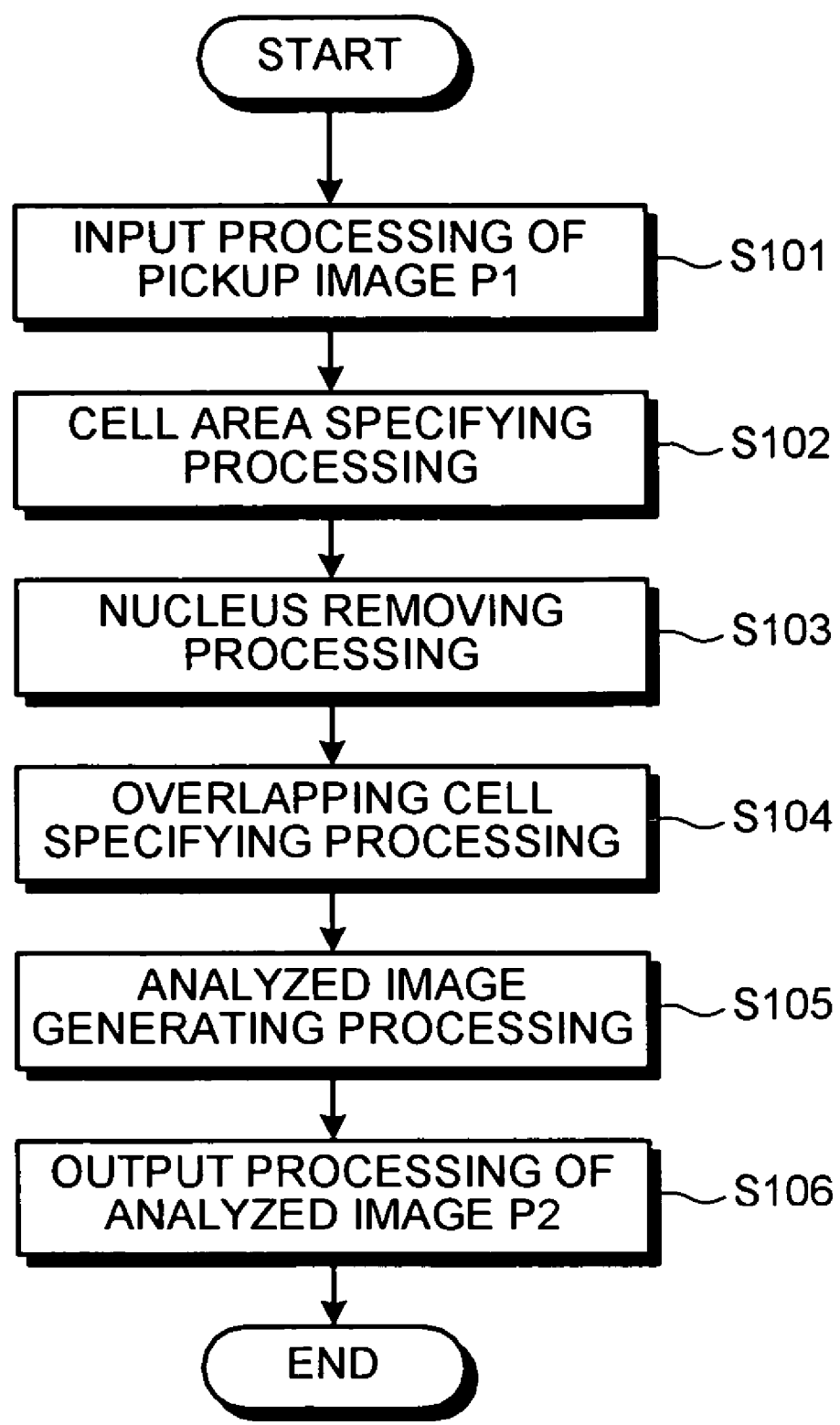
FIG. 2 is a flowchart showing an operation procedure of the image processing apparatus according to the first embodiment of the present invention.

FIG. 2 is a flowchart showing an operation procedure of the image processing apparatus 1 from the acceptance of the input image P1 to the output of the analyzed image P2. Referring to FIGS. 1 and 2, when accepting the input image P1, the controller 10 temporarily stores the input image P1 in the memory 15 and performs an input processing to generate the work image P3 that is a duplicated image of the input image P1 (step S101). The controller 10 then makes the area specifying unit 11 perform a cell area specifying processing in which a cell area emitting fluorescence is specified in the work image P3, to generate a cell area specifying image PA (step S102). Next, the controller 10 makes the nucleus data removing unit 12 perform a nucleus removing processing in which the nucleus data in the cell area specifying image PA is removed, to generate a nucleus-removed image PB (step S103). Next, the controller 10 makes the overlapping cell specifying unit 13 perform an overlapping cell specifying processing in which a cell area where two cells overlap with each other is specified based on a fluorescence intensity of a cytoplasm area shown in the nucleus-removed image PB as the cell area, to generate an overlapping cell specifying image PC (step S104). After that, the controller 10 makes the analyzed image generating unit 14 generate the analyzed image P2 in which the data of the overlapping cell specifying image PC is removed from the input image P1 (step S105). The controller 10 outputs the analyzed image P2 (step S106) to end this operation procedure.

Figure 3:
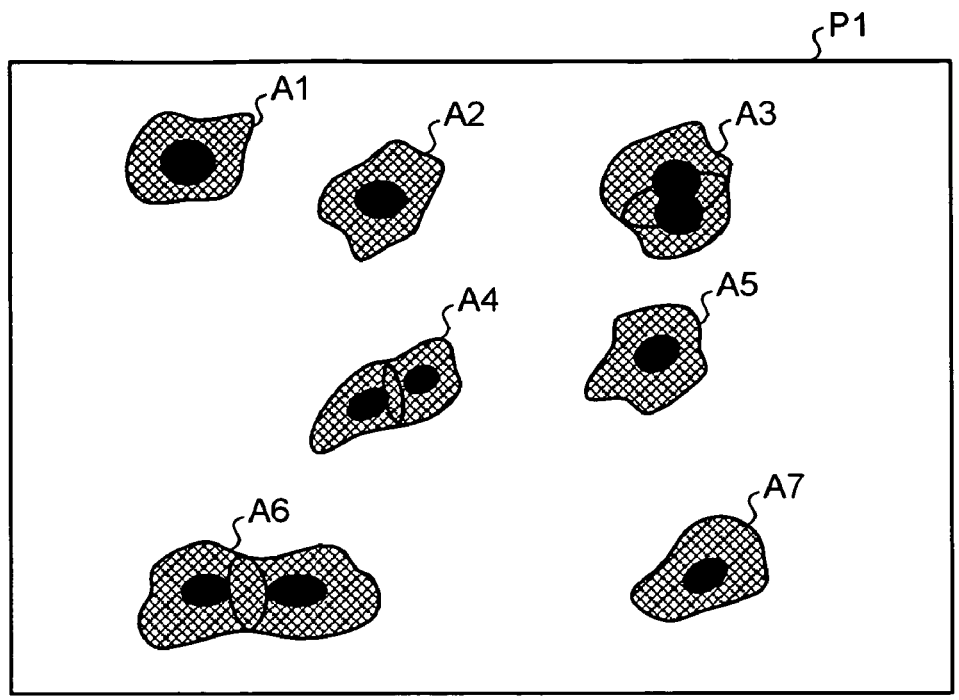
FIG. 3 is a schematic diagram showing an input image according to the first embodiment of the present invention.
Figure 4:
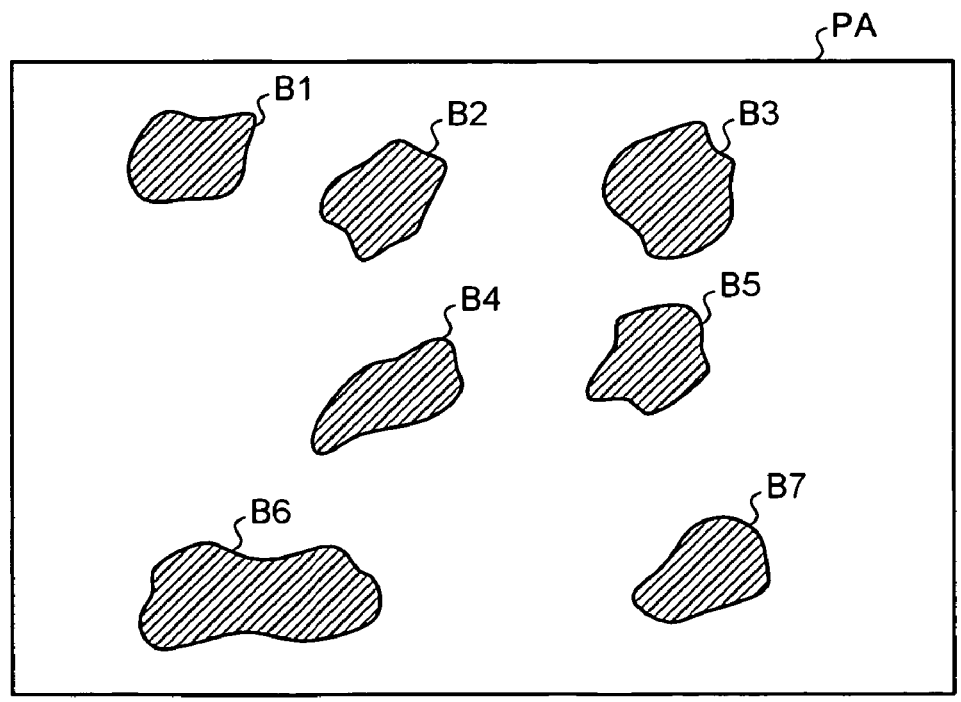
FIG. 4 is a schematic diagram showing a cell area specifying image according to the first embodiment of the present invention.

Hereinafter, each of the processings as mentioned above will be described in detail. FIG. 3 shows an example of the input image P1 that is a fluorescence image obtained through laser irradiation on an analysis target of the cell population. The input image P1 contains, as shown in FIG. 3, isolated cells A1, A2, A5, and A7 together with overlapping cells A3, A4, and A6. Here, the black-painted portion in each cell area of FIG. 3 illustrates a nucleus.

The area specifying unit 11 performs the cell area specifying processing in which pixel areas each with a fluorescence intensity of not less than a predetermined threshold Th0 are specified as cell areas B1 to B7, respectively (step S102), by taking advantage of the fact that the area emitting fluorescence in the input image P1 (work image P3) indicates the cell area to be specified, so that the cell area specifying image PA is generated. The cell areas B1 to B7 may be determined by a known contour extracting processing in which a closed area is defined.

Figure 5:
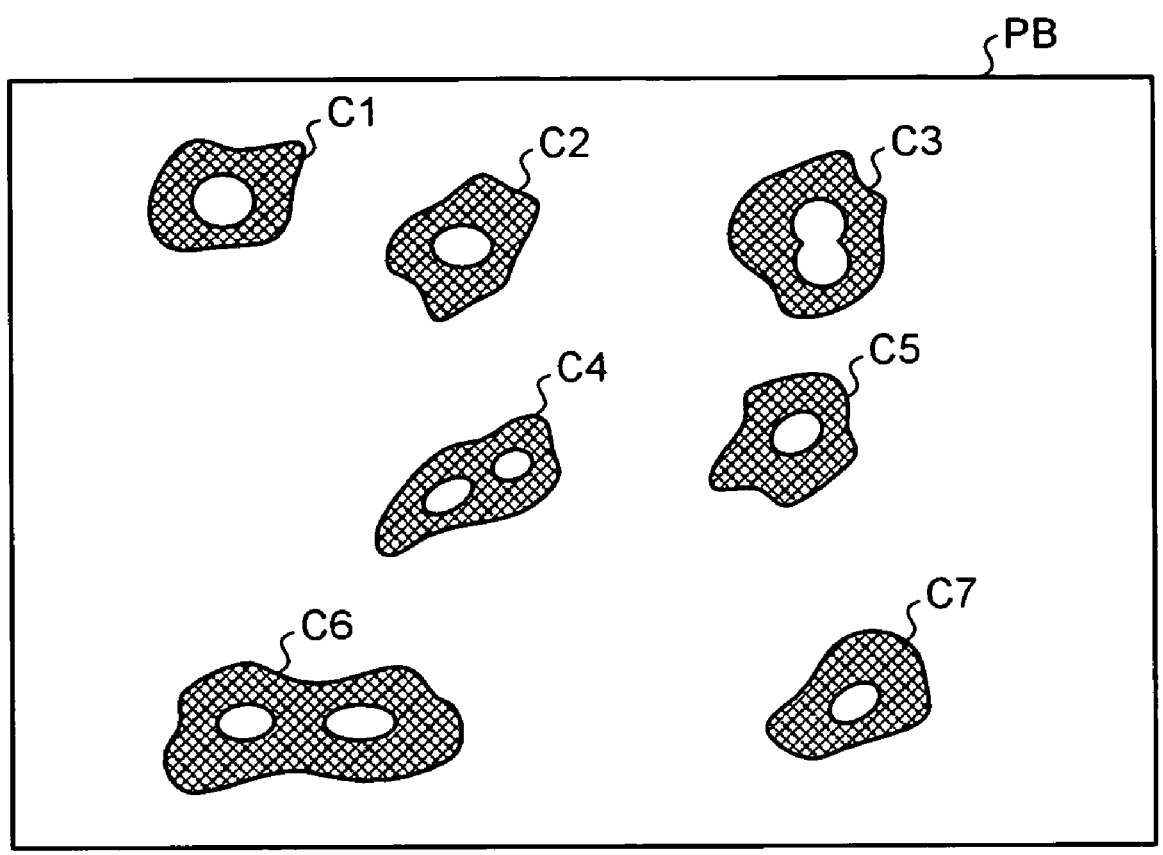
FIG. 5 is a schematic diagram showing a nucleus-removed image according to the first embodiment of the present invention.

The nucleus data removing unit 12 sets a predetermined threshold Th1 between the fluorescence intensities of the nucleus and the cytoplasm, and recognizes as a nucleus portion a pixel area with a fluorescence intensity of not less than the predetermined threshold Th1, by taking advantage of the fact that the fluorescence intensity of a nucleus portion is higher than that of a cytoplasm portion in each of the cell areas B1 to B7. The nucleus data removing unit 12 thus removes the data of the recognized nucleus portion from the work image P3, so that the nucleus-removed image PB is generated (See FIG. 5). In the nucleus removed-image PB shown in FIG. 5, plural cell areas C1 to C7, each of which does not include its own nucleus portion, are shown as cytoplasm areas.

Figure 6:
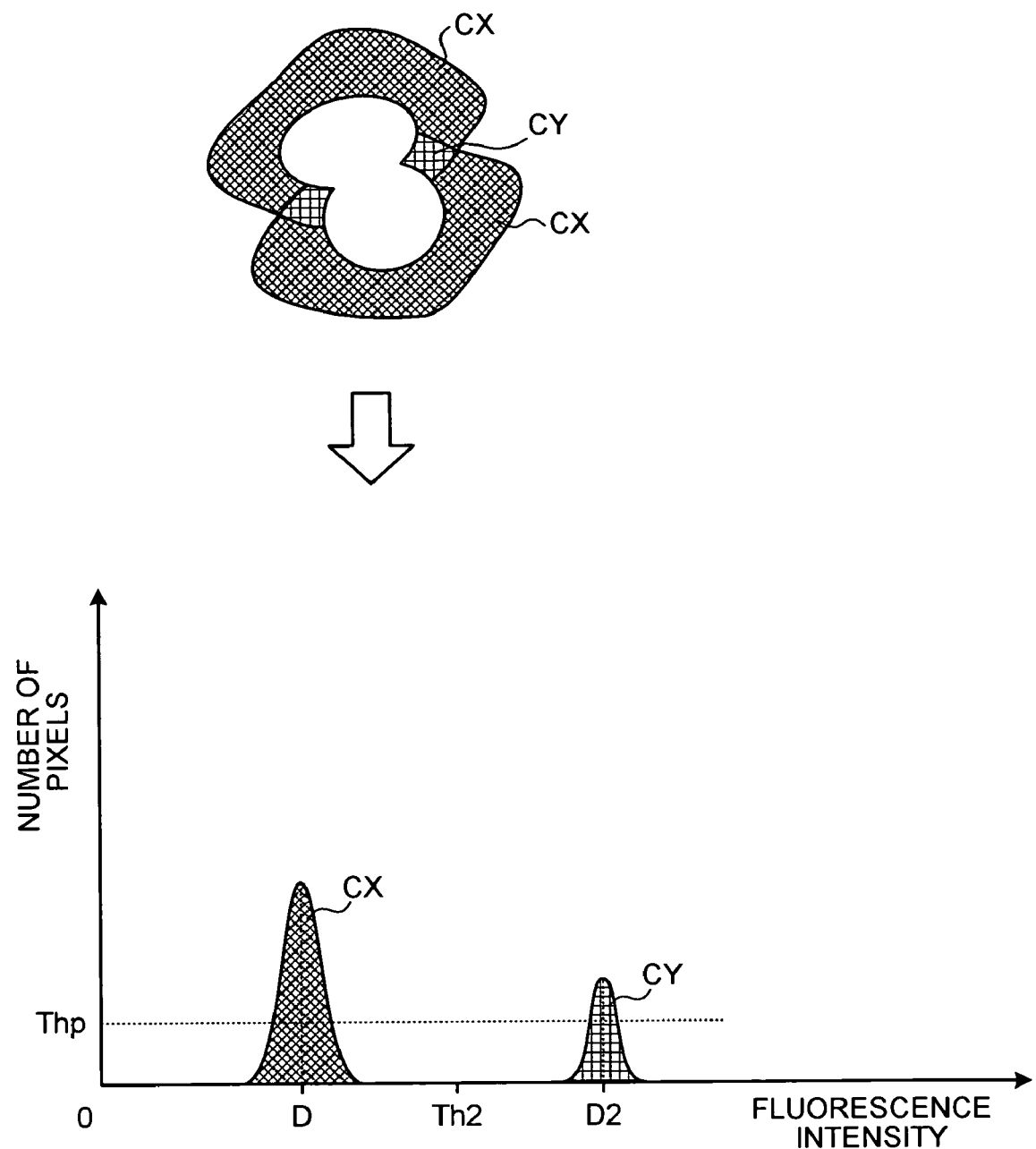
FIG. 6 is a histogram of an overlapping cell according to the first embodiment of the present invention.

The overlapping cell specifying unit 13 generates a histogram showing relativity between a fluorescence intensity and the number of pixels, based on the nucleus-removed image PB. The histogram is created for each of the cell areas C1 to C7. The histogram shown in the lower part of FIG. 6 is for a cell area where two cells overlaps with each other shown in upper part of FIG. 6, like C3, C4, and C6. Referring to the histogram in the lower part of FIG. 6, for the two cells overlapping with each other, there exists an overlapping portion CY where two pieces of cytoplasm overlap with each other, and a fluorescence intensity D2 of the overlapping portion CY is approximately twice the fluorescence intensity D of non overlapping portion CX. In the histogram, a peak at the fluorescence intensity D and a peak at the fluorescence intensity D2 are shown. On the other hand, for the cell areas C1, C2, C5, and C7 each of which is isolated, there exists only one peak at the fluorescence intensity D in the histogram.

Figure 7:
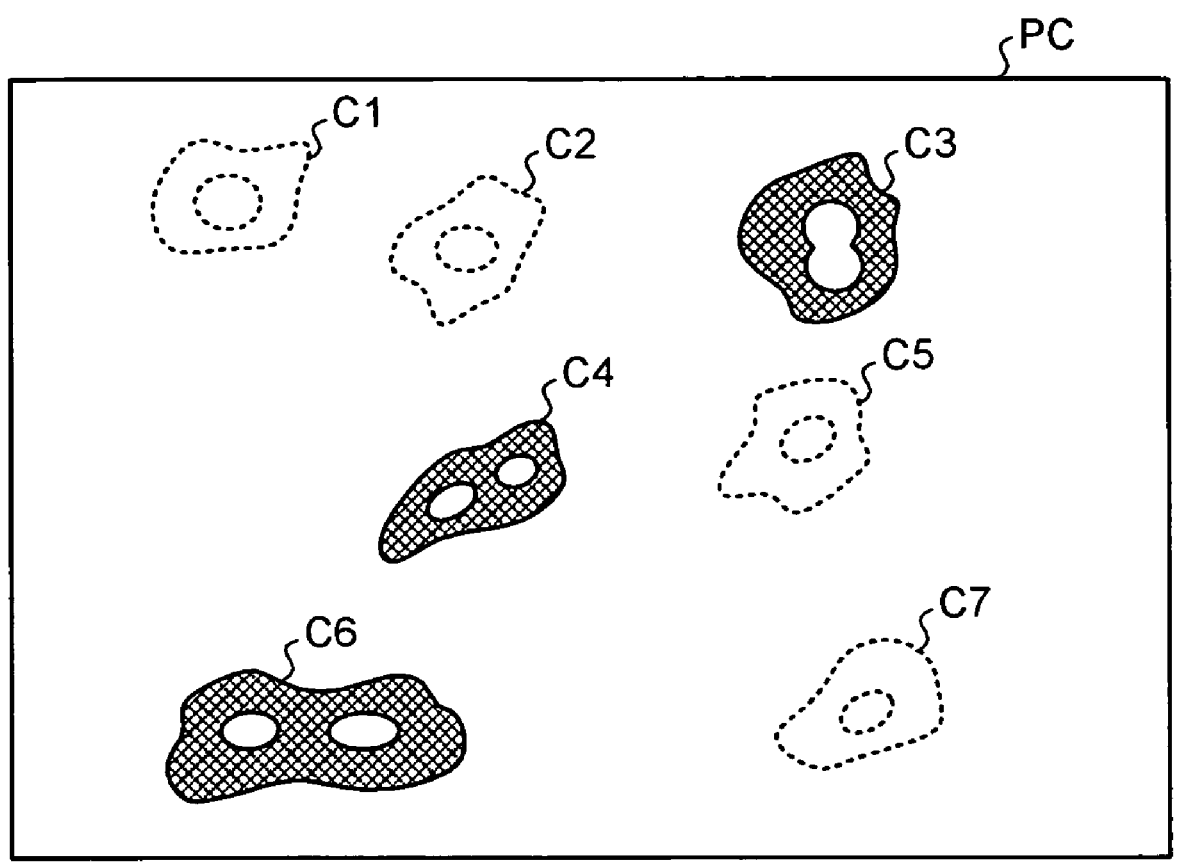
FIG. 7 is a schematic diagram showing an overlapping cell specifying image according to the first embodiment of the present invention.

Here, a threshold Th2 is set between the fluorescence intensity D and the fluorescence intensity D2. A peak at a fluorescence intensity not less than the threshold Th2 is determined to be of the cell area where two or more cells overlap with each other. A threshold Thp may be set for the number of pixels to reduce noises. With this setting, the number of pixels not less than the threshold Thp may be determined to be a peak. More specifically, when there is at least one peak at a fluorescence intensity not less than the threshold Th2 with the number of pixels not less than the threshold Thp in the histogram of the targeted cell area, the overlapping cell specifying unit 13 determines that the targeted cell area should be an overlapping cell area where at least two cells overlap with each other. In this way, the overlapping cell specifying unit 13 identifies the presence of an overlapping cell where two or more cells overlap with each other. FIG. 7 is the work image P3 (overlapping cell specifying image PC) which shows a state where the overlapping cell specifying unit 13 specifies the overlapping cell areas C3, C4, and C6. Here, when there are two or more peaks in the histogram, the overlapping cell specifying unit 13 may determine that there exists an overlapping cell without employing at least one of the threshold Thp and the threshold Th2.

Figure 8A:
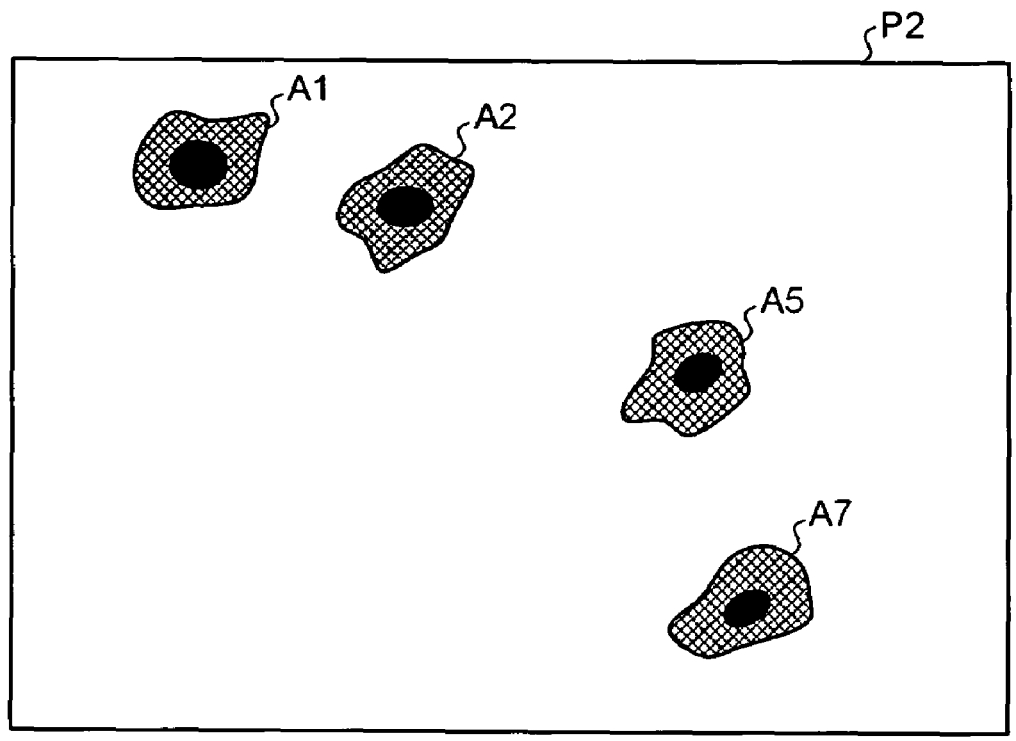
FIGS. 8A and 8B are schematic diagrams showing analyzed images according to the first embodiment of the present invention.
Figure 8B:
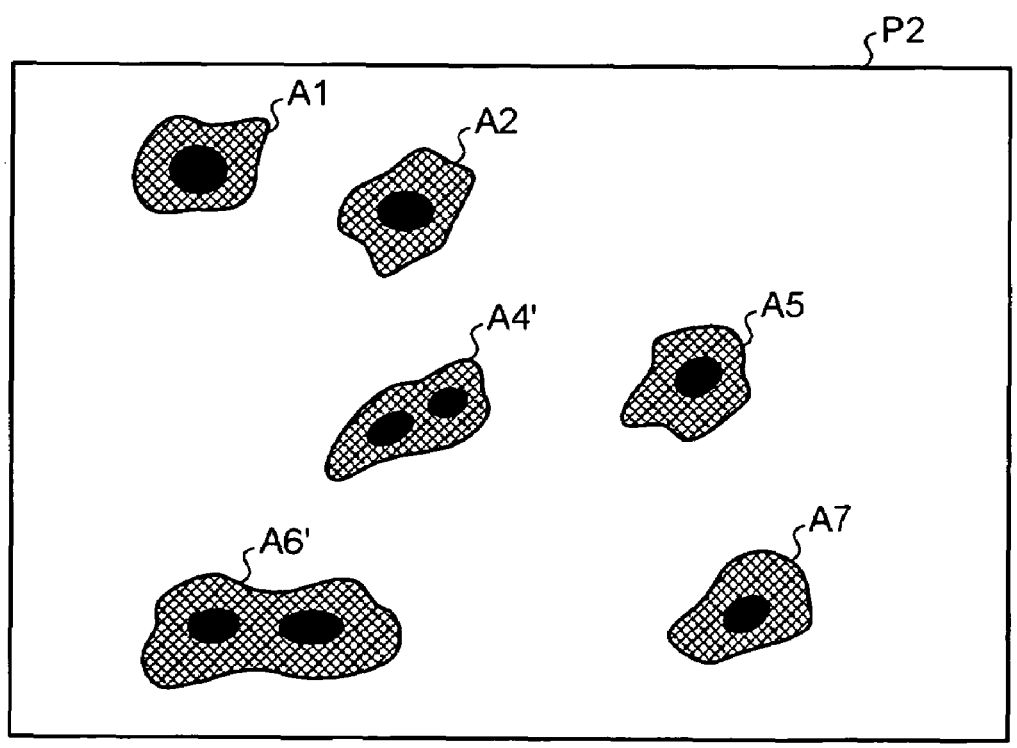

The analyzed image generating unit 14 then generates and outputs the analyzed image P2 (See FIG. 8A) in which the cell areas C3, C4, and C6 shown in the overlapping cell specifying image PC are removed. In the analyzed image P2, only the isolated cells A1, A2, A5, and A7 are shown, which allows an analysis only on isolated cells. Alternatively, as shown in FIG. 8B, the overlapping cells A4' and A6' may remain as an analysis target in the analyzed image P2. This is because the main purpose of using a cytometer is to perform an analysis on nuclear DNA, and each of A4' and A6' can be treated as two separate cells each with its own nucleus, regardless of their overlapping cytoplasm portion. To realize the above treatment, it is only necessary that a condition that a cell area containing overlapping cytoplasm and two separate nuclei should remain as a separate cell be added to the overlapping cell specifying processing (step S104) of the flowchart in FIG. 2. On the contrary, it is obvious that a cell containing a separate nucleus and cytoplasm without overlapping with another cell is in an anaphase stage of cell cycle and maintained as the analysis target in the above flowchart. As a result, the analysis target is focused only on isolated cells, which allows an accurate analysis.

Figure 9:
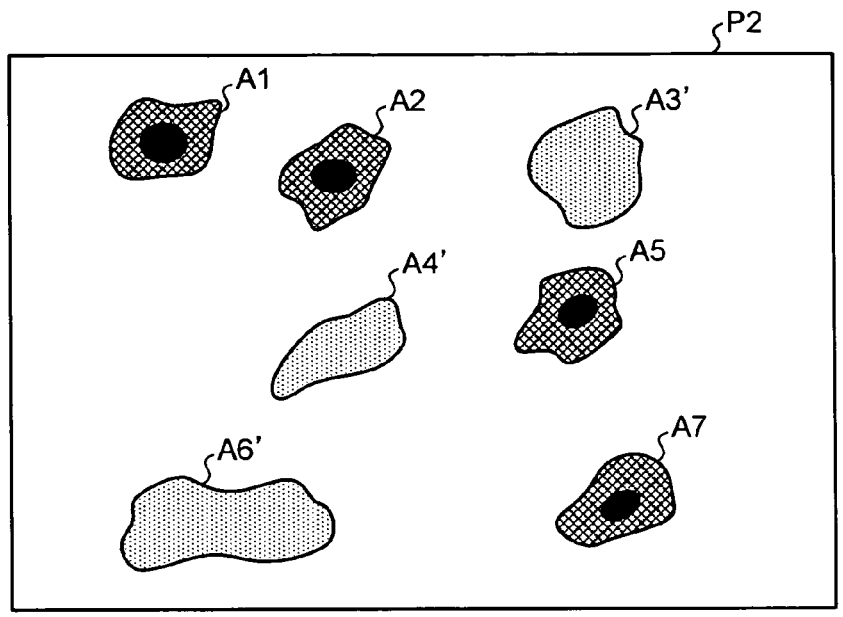
FIG. 9 is a schematic diagram showing another analyzed image according to the first embodiment of the present invention.

In the first embodiment, the analyzed image P2 generated by the analyzed image generating unit 14 is output as it is. However, alternatively as shown in FIG. 9, the analyzed image P2 with the overlapping cell areas A3', A4', and A6' added, may be output. An image processing of the overlapping cell areas A3', A4', and A6' can be realized by displaying the overlapping cells in a specific color to clearly identify them, for example. The output of the analyzed image P2 containing the overlapping cell areas A3', A4', and A6' makes it possible not only to perform an analysis on the isolated cells A1, A2, A5, and A7 but also to know an actual distribution of the overlapping cells. Accordingly, an indicator in creating specimens can be obtained.

Next, a second embodiment of the present invention will be described. In the first embodiment described above, the nucleus portion and the cytoplasm portion are discriminated with each other by the nucleus data removing unit 12, based on the difference in fluorescence intensity. However, in the second embodiment, the nucleus portion and the cytoplasm portion are discriminated by the nucleus data removing unit 12, based on the difference in fluorescence wavelength (fluorescence color).

Figure 10:
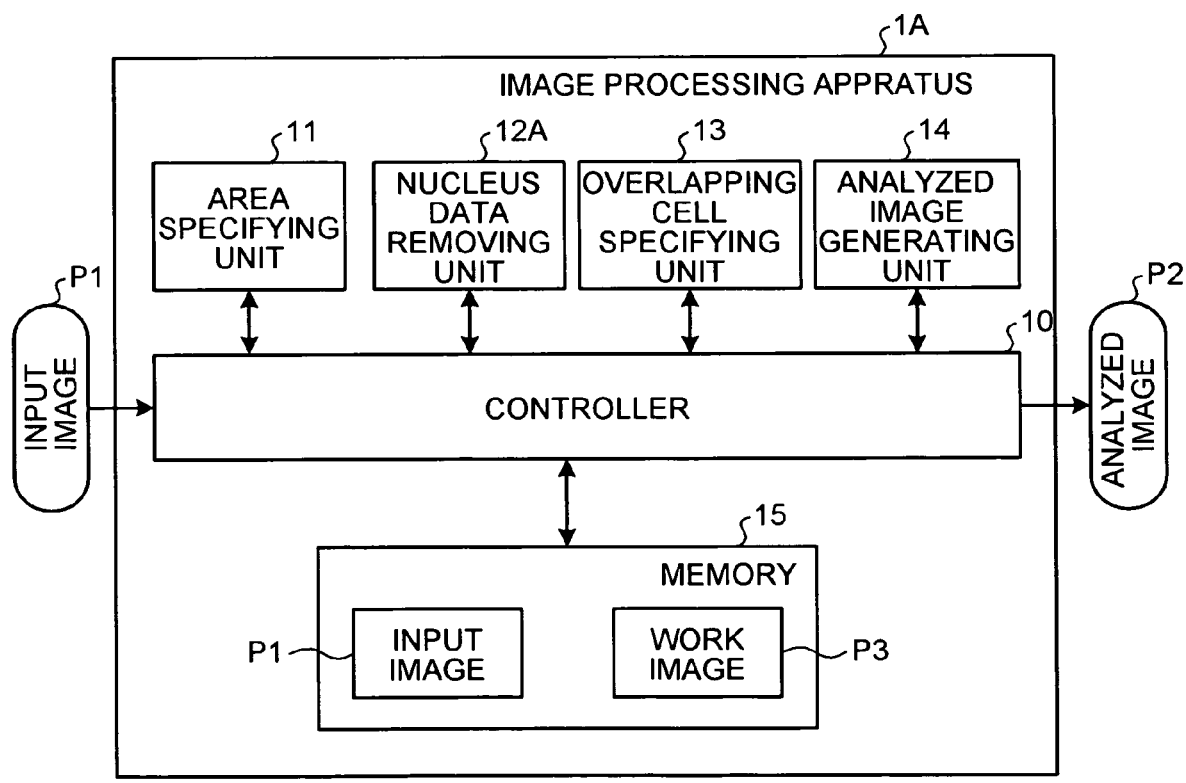
FIG. 10 is a block diagram showing the schematic structure of an image processing apparatus according to a second embodiment of the present invention.

FIG. 10 is a block diagram showing a structure of an image processing apparatus according to the second embodiment. This image processing apparatus 1A shown in FIG. 10, has a nucleus data removing unit 12A in place of the nucleus data removing unit 12 described in the first embodiment. To remove the nucleus portion, the nucleus data removing unit 12A detects the difference in fluorescence wavelength between cytoplasm and nucleus, and removes a pixel area with a fluorescence wavelength unique to a nucleus, from the cell area. Here, structures other than the nucleus data removing unit 12A are the same as those in the first embodiment, being denoted by the same reference numerals.

Figure 11:
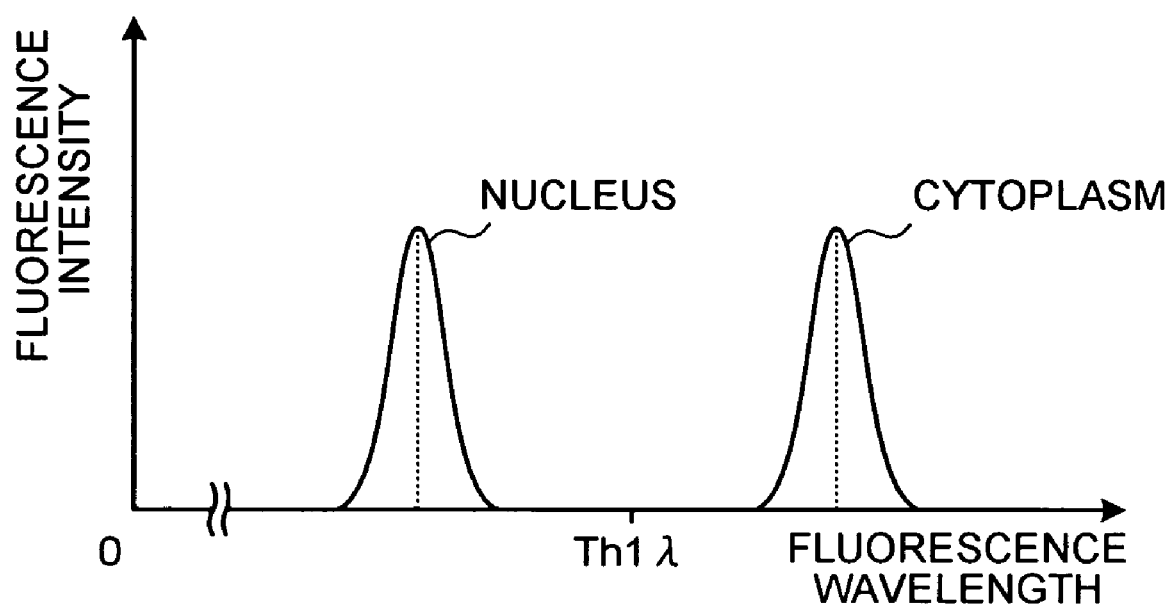
FIG. 11 is a graph showing relativity between a fluorescence wavelength and fluorescence intensities of a nucleus and a cytoplasm.

For example, when a cell stained in acridine orange is irradiated with a laser beam, for example, 488 nm line of Ar ion laser, its nucleus emits green fluorescence and its cytoplasm emits red fluorescence. The nucleus data removing unit 12A sets a predetermined threshold Th1λ for fluorescence wavelength as shown in FIG. 11. Accordingly, the nucleus data removing unit 12A determines whether the fluorescence wavelength of the pixels of each cell area shown in the cell area specifying image PA is less than the threshold Th1λ to generate the nucleus-removed image PB where the data of a pixel area with a fluorescence wavelength of less than the threshold Th1λ is removed.

In the second embodiment, the nucleus data removing unit 12A generates the nucleus-removed image PB where nucleus data is removed, by discriminating between a nucleus and a cytoplasm based on the difference in fluorescence wavelength. Hence, even if the difference in fluorescence intensity between a nucleus and a cytoplasm is small, the nucleus data removing unit 12A can generate the nucleus-removed image PB with nucleus data surely removed. Here, in the processing where the nucleus data removing unit 12A discriminates the difference between a nucleus and a cytoplasm, it is possible to remove nucleus data based on a combination of a fluorescence intensity described in the first embodiment and a fluorescence wavelength described in the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
    an area specifying unit that specifies a closed area emitting fluorescence in a first fluorescence image as a cell area in a cell population including a number of dispersed cells, the fluorescence image being generated from fluorescence emitted by the cell population irradiated with a scanning laser beam;
    a nucleus data removing unit that removes image data corresponding to a nucleus in the cell area from the first fluorescence image to generate a second fluorescence image;
    an overlapping cell specifying unit that specifies an overlapping cell area where cells overlap in the second fluorescence image, based on a fluorescence intensity of a cytoplasm portion corresponding to an image where the image data corresponding to the nucleus is removed; and
    an analyzed image generating unit that generates an analyzed image in which image data of the overlapping cell area is removed from the first fluorescence image.

2. The image processing apparatus according to claim 1, wherein the overlapping cell specifying unit generates a histogram showing a relativity between the fluorescence intensity of the cytoplasm portion and a number of pixels, to specify the overlapping cell area based on a peak in the histogram.

3. The image processing apparatus according to claim 2, wherein the overlapping cell specifying unit specifies an area having at least two peaks in the histogram as the overlapping cell area.

4. The image processing apparatus according to claim 2, wherein the overlapping cell specifying unit sets a predetermined threshold higher than a fluorescence intensity of the cytoplasm portion of an isolated cell, and specifies a cell portion as the overlapping cell area when there exists a peak with an intensity over the threshold in the histogram.

5. The image processing apparatus according to claim 1, wherein the nucleus data removing unit specifies a portion having a fluorescence intensity of not less than a predetermined threshold in the cell area as a nucleus, and removes data of the specified nucleus.

6. The image processing apparatus according to claim 1, wherein the nucleus data removing unit specifies the nucleus based on a difference in fluorescence wavelength in the cell area, and removes data of the specified nucleus.

7. The image processing apparatus according to claim 1, wherein the analyzed image generating unit generates the analyzed image to indicate the overlapping cell area.

* * * * *